(12) United States Patent
Tan et al.

(10) Patent No.: US 10,078,681 B2
(45) Date of Patent: *Sep. 18, 2018

(54) **DIFFERENTIATED SECONDARY INDEX MAINTENANCE IN LOG STRUCTURED *NOSQL* DATA STORES**

(71) Applicant: International Business Machines Corporation, Armonk, NY (US)

(72) Inventors: Wei Tan, Elmsford, NY (US); Sandeep Tata, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 311 days.

This patent is subject to a terminal disclaimer.

(21) Appl. No.: 14/976,149

(22) Filed: Dec. 21, 2015

(65) Prior Publication Data
US 2016/0188649 A1 Jun. 30, 2016

Related U.S. Application Data

(63) Continuation of application No. 13/837,812, filed on Mar. 15, 2013, now Pat. No. 9,218,383.

(51) Int. Cl.
*G06F 17/30* (2006.01)

(52) U.S. Cl.
CPC .. *G06F 17/30578* (2013.01); *G06F 17/30117* (2013.01); *G06F 17/30312* (2013.01); *G06F 17/30321* (2013.01); *G06F 17/30339* (2013.01); *G06F 17/30345* (2013.01); *G06F 17/30575* (2013.01); *G06F 17/30581* (2013.01)

(58) Field of Classification Search
None
See application file for complete search history.

(56) References Cited

U.S. PATENT DOCUMENTS

| 7,765,186 | B1 | 7/2010 | Hu et al. |
|---|---|---|---|
| 8,229,899 | B2 | 7/2012 | Anderson et al. |
| 8,255,505 | B2 | 8/2012 | Falchuk et al. |
| 8,266,122 | B1 | 9/2012 | Newcombe et al. |
| 2009/0125635 | A1 | 5/2009 | Barga et al. |

(Continued)

OTHER PUBLICATIONS

Chang, F. et al., "Bigtable: A Distributed Storage System for Structured Data," ACM Transactions on Computer Systems, Jun. 2008, vol. 26, No. 2.

(Continued)

*Primary Examiner* — Alexander Khong
(74) *Attorney, Agent, or Firm* — Scully, Scott, Murphy & Presser, P.C.; Rahan Uddin, Esq

(57) ABSTRACT

There are provided a method for operating multi-node data stores. The method performs storing a data table in a first computing node and stores an index table in a second computing node. The index table provides keys used for accessing data in the first computing node and other multi-node data stores. The method performs operations that update or read the data table accessed from the first computing node and the index table accessed from the second computing node. The operations optimizes between latency in updating or reading the data table and the index table and data consistency maintained between data entries in the data table and data entries pointed by indices in the index table.

14 Claims, 9 Drawing Sheets

(56) References Cited

U.S. PATENT DOCUMENTS

| | | | |
|---|---|---|---|
| 2010/0281005 A1* | 11/2010 | Carlin | G06F 17/30312 707/696 |
| 2011/0302194 A1 | 12/2011 | Gonzalez et al. | |
| 2012/0016881 A1 | 1/2012 | Hrle et al. | |
| 2012/0072656 A1 | 3/2012 | Archak et al. | |
| 2013/0275391 A1 | 10/2013 | Bawara et al. | |
| 2013/0332484 A1* | 12/2013 | Gajic | G06F 17/30286 707/770 |
| 2014/0074810 A1* | 3/2014 | Wang | G06F 17/30864 707/696 |

OTHER PUBLICATIONS

Sun et al., "Scalable RDF Store Based on HBase and MapReduce," 2010 3rd International Conference on Advanced Computer Theory and Engineering (ICACTE), Aug. 2010, pp. 633-636, vol. 1.

Baker et al., "Megastore: Providing Scalable, Highly Available Storage for Interactive Services," 5th Biennial Conference on Innovative Data Systems Research (CIDR '11), Jan. 2011, pp. 223-234.

Tatemura et al., "Partiqle: An Elastic SQL Engine Over Key-Value Stores," SIGMOD '12, May 2012, pp. 629-632.

Cipar et al., "LazyBase: Trading Freshness for Performance in a Scalable Database," EuroSys '12, Apr. 2012.

Agrawl, P., et al., "Asynchronous View Maintenance for VLSD Databases," Proc. SIGMOD Conference, Jun./Jul. 2009, pp. 179-192.

Armbrust, M., et al., "PIQL: Success-Tolerant Query Processing in the Cloud," Proceedings of the VLDB Endowment, Aug. 2012, vol. 5, No. 3.

Bailis, P., et al., "Probabilistically Bounded Staleness for Practical Partial Quorums," Proceedings VLDB Endowment, Aug. 2012, vol. 5, No. 8.

Brewer, E., "CAP Twelve Years Later: How the "Rules" Have Changed," IEEE Computer Society, Feb. 2012, pp. 23-29.

Chen, G., et al., "A Framework for Supporting DBMS-like Indexes in the Cloud," Proceedings of the VLDB Endowment, Jul./Aug. 2011, pp. 702-713.

Chen, J., et al., "Walnut: A Unified Cloud Object Store," Proc. SIGMOD Conference, May 2012, pp. 743-754.

Choy, D., et al., "Locking Protocols for Two-Tier Indexing of Partitioned Data," International Workshop on Advanced Transaction Models and Architectures.

Cooper, B., et al., "PNUTS: Yahoo!'s Hosted Data Serving Platform," Proceedings of the VLDB Endowment, Aug. 2008.

Cooper, B., et al., "Benchmarking Cloud Serving Systems with YCSB," Proceedings of the 1st ACM symposium on Cloud computing (CoCC '10), Jun. 2010.

Corbett, J., et al., "Spanner: Google's Globally-Distributed Database," Proceedings of OSDI 2012, 2012, pp. 1-14.

Decandia, G., et al., "Dynamo: Amazon's Highly Available Key-value Store," ACM SIGOPS Symposium on Operating Systems Principles (SOSP), Oct. 2007, pp. 205-220, vol. 1.

Graefe, G., et al., "B-tree indexes for high update rates," SIGMOD Record, Mar. 2006, pp. 39-44, vol. 35, No. 1.

Hunt, P., et al., "ZooKeeper: Wait-Free coordination for Internet-scale systems," Proc. USENIX ATC, 2010, vol. 1.

Oneil, P., et al., "The Log-Structured Merge-Tree (LSM-Tree)," Acta Informatica, 1996, vol. 33, Issue 4.

Sears, R., et al., "bLSM: A General Purpose Log Structured Merge Tree," Proc. SIGMOD Conference, May 2012, pp. 217-228.

Yabandeh, M., et al., "A Critique of Snapshot Isolation," Proceedings of the 7th ACM European Conference on Computer Systems (EuroSys '12), Apr. 2012, pp. 155-168.

Zhou, J., et al., "Lazy Maintenance of Materialized Views," Proceedings of the VLDB Endowment, Sep. 2007, pp. 231-242.

\* cited by examiner

I/O Cost of Diff-Index schemes
1100

| Scheme | Action | Base Put | Base Read | Index Put | Index Read |
|---|---|---|---|---|---|
| no-index | update<br>read | 1<br>— | 0<br>— | 0<br>— | 0<br>— |
| sync-full | update<br>read | 1<br>0 | 1<br>0 | 1+1<br>0 | 0<br>1 |
| sync-insert | update<br>read | 1<br>0 | 0<br>M | 1<br>(M) | 0<br>1 |
| async-simple | update<br>read | 1<br>0 | [1]<br>0 | [1+1]<br>0 | 0<br>1 |

1105 — no-index
1110 — sync-full
1115 — sync-insert
1120 — async-simple

FIG. 11

DIFFERENTIATED SECONDARY INDEX MAINTENANCE IN LOG STRUCTURED NOSQL DATA STORES

CROSS-REFERENCE TO RELATED APPLICATION

The present application is a continuation of U.S. patent application Ser. No. 13/837,812 filed Mar. 15, 2013, the entire contents and disclosure of which is incorporated by reference herein.

BACKGROUND

This disclosure relates generally to data storage, and particularly to a multi-node data store.

BACKGROUND OF THE INVENTION

A data store refers to a data repository that uses a database, e.g., IBM® DB2 ®, etc., to manage data stored in the data repository. A data store may include a plurality of computing nodes, each of which uses a database management system to management data stored in a corresponding computing node. In recent years, scale-out data stores, referred as NoSQL data stores, are gaining attraction to support high-traffic Internet applications, e.g., yelp.com. A NoSQL data store is a class of database management systems that do not use a relational database model. A category of NoSQL data stores includes Log Structured Merge (LSM) Tree which is optimized for writing of data and MapReduce for scanning of data but is not optimized for point queries, e.g., a query directed to a specific datum. Examples of NoSQL data stores include, but are not limited to: Dynamo, BigTable, PNUTS, Cassandra®, HBase, etc. These data stores usually provide limited APIs (Application Programming Interfaces), e.g., Create, Read, Update, Delete operations, compared to relational databases, and focus on scalability and elasticity on commodity hardware. NoSQL data stores are particularly attractive for applications that perform relatively simple operations while needing low latency guarantees as data stored in NoSQL data stores scale to large sizes, e.g., 1 Petabyte. While these NoSQL data stores are a great fit for high-scale, low-complexity applications, as these applications get more complex, a lack of basic database functionality, e.g., secondary indexes, has become a stumbling factor.

SUMMARY

There are provided a method, a system and a computer program product for operating multi-node data stores. The system stores at least one data table in at least one first computing node and stores at least one index table in at least one second computing node. The index table provides keys used for accessing data in said first computing node and other multi-node data stores. The system performs operations that update or read the at least one data table accessed from the at least one first computing node and the at least one index table accessed from the at least one second computing node. The operations optimizes between latency in updating or reading the at least one data table and the at least one index table and data consistency maintained between data entries in the at least one data table and data entries pointed by indices in the at least one index table.

In order to accelerate point queries in NoSQL data stores, there is provided a secondary, global index, managed by a plurality of RegionServers. A global index effectively avoids broadcasting queries to every data partition. A server-managed index is more robust and exposes less detail to clients. This secondary index can have multiple consistency levels that includes: (1) fully synchronizing data consistency between a data table and a corresponding index table in the way that an index entry in an index table is immediately updated upon inserting a new data entry to a corresponding data table; (2) an index entry in an index table is not updated upon an insertion of a corresponding new data entry into a corresponding data table (that index entry in an index table is updated upon receiving a query directed to that a corresponding old index entry); (3) an update to an index entry in an index table asynchronies with an insertion of a corresponding new data entry to a data table; (4) during a session, i.e., interactive information exchange including one or more messages in each direction, data consistency between a data table and a corresponding index table is maintained in the way that an index entry in an index table is immediately updated upon a new data entry to a corresponding data table. By having a secondary index with multiple consistency levels, a balance between accuracy of data and latency in retrieving data can be managed in different levels. Different consistency levels enable manageable tradeoffs between the accuracy and the latency, which provide differentiated performance expectation for workloads. According to different workloads, that balance can be changed, e.g., sacrificing accuracy of data in order to speed up processing of data entry requests.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 11 illustrates a table that describes I/O cost of each of the multiple different index update schemes;

DETAILED DESCRIPTION

Astonishing growth and diversity in data have profoundly affected a way that data have been stored and served. Monolithic relational databases that are good at processing structured data and excel in ACID (atomicity, consistency, isolation, durability) cannot handle high-traffic Internet applications in an elastic manner. This is because relational databases put restrictions on data normalization and consistency, and also the relational databases are not able to perform data sharing in an automatic way so that the relational databases are difficult to scale out. To address challenges in flexible schema and elasticity, data stores dealing with columns, key/value pairs, documents and graphs have emerged and collectively identified as NoSQL data stores. A NoSQL data store, e.g., HBase, that supports a convergence of transactional and analytics workloads is able to offer balanced "read" and "write" performance.

Figure 1:
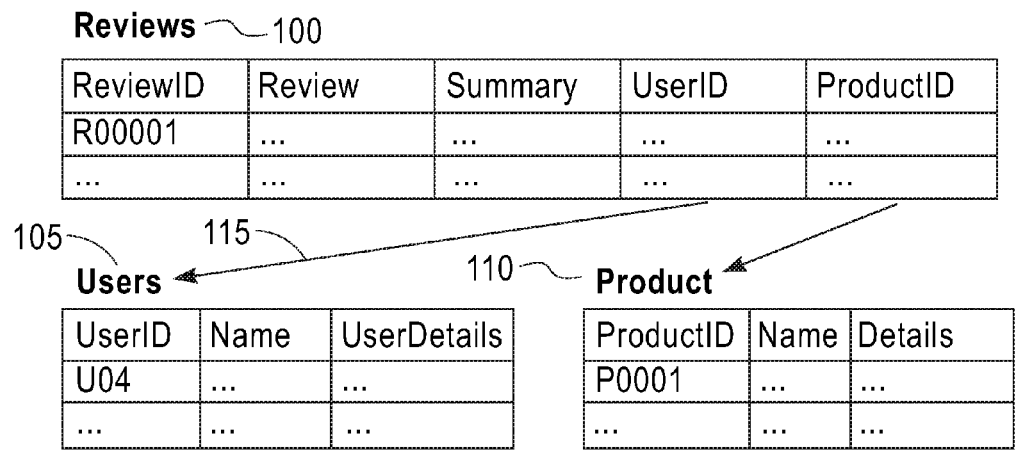
FIG. 1 illustrates exemplary three tables using a database schema.

Consider a web application that manages social reviews (e.g., yelp.com). Such an application tracks reviews posted by users about business, e.g., restaurants, bars, clubs, etc. A common query is to list all reviews by a certain criteria, e.g., of a particular restaurant, by a particular user. A schema in FIG. 1 shows exemplary three tables: "Users" table 105, "Products" table 110, and "Reviews" table 100. In any scale-out data store, i.e., a data store that can increase its data storage capacity as a demand for the data storage increases, the tables 100-110 can be partitioned across a cluster of computing nodes. A given table can be partitioned by using one attribute. While a query can be served using a full table scan, e.g., scanning of tables 100-110, this full table scan would incur an unacceptable latency to an interactive web application, e.g., yelp.com.

In a distributed data store, data are partitioned into regions, e.g., countries or counties or states, etc. From the perspective of indexes' scope, there are two types of indexes: a local index and a global index. A local secondary index is an index on data in a given region and co-located with a data region. In contrast, a global index indexes all the data in the table, and is potentially itself partitioned across all nodes. An advantage of a global index is in handling of highly selective queries, i.e., queries whose results reside in only a small number of regions, e.g., one or two regions. This is because a global index has an overall knowledge of data locations, and sends queries only to those regions that actually contain required data. Drawback of the global index is that an update of the global index incurs remote procedure calls (RPC) and results in additional latency when data and index are not collocated. On the other hand, a local index has an advantage of a fast index update, e.g., within a couple of milliseconds, because of its collocation with a data region. A drawback of the local index is that every query has to be broadcast to each region, thus the query is costly especially for highly selective queries.

Consider a query, for example, "Get all reviews by user u" on the "Reviews" table 100 shown in FIG. 1 that includes a secondary index 115 on the "User" table 105. With local indexes, the query would need to be broadcasted to all the nodes in a cluster, and every node would send results of probing the local index to a coordinator who would combine the results before sending them back to a client node which sent the query. With global indexes, upon receiving the query, a data store will be able to locate exactly a node (or a small set of nodes) that includes relevant values and return a pointer to an original row that includes data that client looks for. For an interactive application, global indexes better support low-latency queries at large volumes, e.g., 1 million queries per day. If queries are uniformly distributed over a key-space (i.e., all the possible keys used in a data table that records data), with global indexes, a total throughput is limited by a throughput of a single node since every node has to participate in every query. For global indexes, in the best case, a total throughput of a data store can be the sum of throughputs of all the nodes in the data store. The worst case for the global indexes is when all the queries are directed to a single key whose index has to be served by a single node, in which is the throughput of that single node determines the total throughput of a data store.

A central data structure used in NoSQL data stores, for example, BigTable is a Log-Structured-Merge (LSM) Tree. In contrast to B-Trees, i.e., a binary tree which can include a plurality of leaf nodes, LSM Trees are well suited to high-update ratio workloads (e.g., frequent review updates in yelp.com) because they only incur sequential I/O for "writes," and incur random I/O only for "reads."

However, a design and implementation of secondary indexes in a distributed LSM is not trivial, for the following reasons. Firstly, workloads of Internet applications are becoming more write-intensive with a proliferation of click streams, GPS locations, sensors events, etc. LSM is designed to address this challenge by optimizing a latency of writes. In the meanwhile, ad hoc queries are still important to make use of data stored in LSM. While indexes improve random read performance, the indexes have inevitably negative impact on write performance. This is because that a benefit of using LSM to speed up write will be largely infringed if adding indexes brings overhead to writes, e.g., a write operation to a data table may require more than one index update.

An issue (i.e., index's overhead to data write) applies to RDBMS (Relational Database Management System) and is not unique for LSM. However, the impact on a "write" (i.e., inserting a new data entry into a data table) can be more serious in LSM stores given a nature of its underlying data structure: in LSM there is no in-place update and consequentially, "insert" and "update" are indistinguishable. This characteristic results in that, an index update needs to incur a data read operation into a data table in order to remove a stale index entry. That is to say, a data read operation is added into a path of a data write operation. For example, in HBase (i.e., an implementation of LSM) a data write operation takes a couple of milliseconds but a data read operation can take over ten milliseconds. NoSQL data stores including those LSM-based data stores, are partitioned and distributed to handle huge volume of data, e.g., 10 petabytes. Presumably, any index used in a NoSQL data store is to be large, too.

LSM-Tree Model

Figure 2:
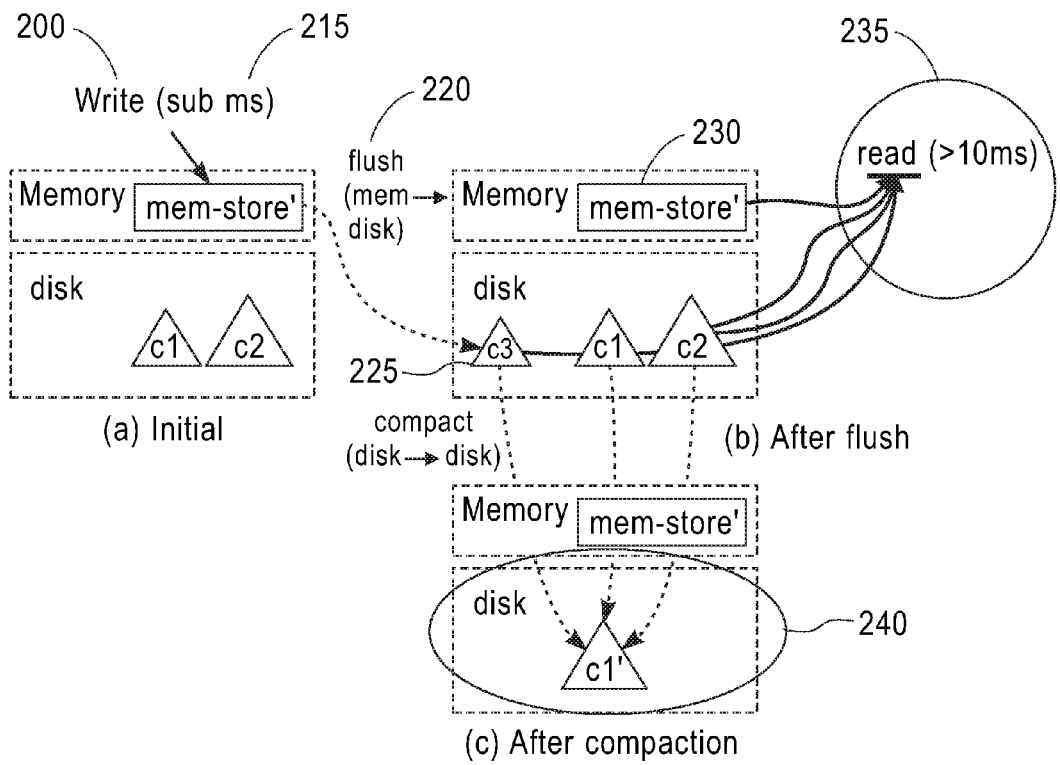
FIG. 2 illustrates Log Structured Merge (LMS) Tree.

LSM-Tree prevails in workloads with a high rate of data record insertions and deletions. LSM-Tree defers and batches data changes, by cascading them from a memory to storage device (e.g., a disk, etc.) in a batch manner LSM-Tree includes an in memory store, e.g., in a form of a tree or map, and multiple immutable data storages, e.g., usually in a form of a B-tree or its variants. For example, LSM-Tree in FIG. 2(*a*) includes an in memory store (e.g., "mem-store" in FIG. 2) and two disk stores C1 and C2. Operations on LSM-Tree are illustrated briefly in FIG. 2. In FIG. 2(*a*), writing 200 into LSM-Tree is an insertion into a mem-store 210. In practice, a data write operation usually also involves an appending to a commit log for a durability purpose, e.g., in order to recover from a mem-store failure. Therefore, a data write operation that includes a memory store operation and an optional sequential I/O, is fast 215, e.g., less than a millisecond. When a storage capacity of a mem-store reaches a certain volume, its content is flushed, i.e., pushed 220 to a storage device, e.g., a disk C3 225. For example, the mem-store 210 in FIG. 2(*a*) is flushed (i.e., pushsed) into a new storage device, e.g., disk C3 225 shown in FIG. 2(*b*). After the push 220, the mem-store becomes empty and denoted as a mem-store' 230 in FIG. 2(*b*). With this procedure, every write is virtually an appending; an update or deletion to an existing data is achieved by adding a new version of the data (or setting an invalidation bit in case of deletion) into the mem-store. By this means, LSM-Tree has no in-place update and as a result is able to keep multiple versions of data. To retrieve either one or more versions of data, the mem-store and all disk stores need to be scanned 235 (shown in FIG. 2(*b*)). Therefore, a data read operation may include multiple random I/O and is usually slow, e.g., more than 10 millisecond. To alleviate this slow data read operation and consolidate multi-versions of data into a single place, multiple disk stores are periodically flushed, merged and compacted. As an example, storage devices C1, C2 and C3 are compacted 240 into a storage device C1', as shown in FIG. 2(*c*).

Apache HBase is a LSM-Tree data store. In HBase, data is organized in tables. A table includes rows that are identified by a (primary) row key. Each row may include an arbitrary number of named columns with corresponding values and timestamps. Columns may be organized into column families, and columns in a single family find them co-located on a storage device, e.g., a disk. Each column family may be partitioned and stored in multiple computing nodes, and in each computing node each column may stored as a LSM-tree.

The following lists a subset of HBase's data table storage and retrieval methods:

put(table, key, colname, colvalue): Insert a column value ("colvalue") into a column corresponding to "colname" into a row corresponding to "key" in a table corresponding "table."

get(table, key, colname): Read a column value and its timestamp from an entry at a column corresponding to "colname" and at a row corresponding "key" in a table corresponding "table."

get(table, key, colname, minTime, maxTime): Read a column value and its timestamp from an entry at a column corresponding to "colname" and at a row corresponding "key" subject to the timestamp being between 'minTime' (i.e., a minimum time) and 'maxTime' (i.e., a maximum time) from a table corresponding "table."

delete(table, key, colname): Delete a column corresponding to "colname" from a row corresponding "key" in a table corresponding "table."

All these API methods operate on a table, e.g., an index table or a data table. Although not shown, there are also multi-column versions of these methods. For example, the multi-column version of "put" operation allows many columns in a single row to be updated with a single "put" function call.

Figure 3:
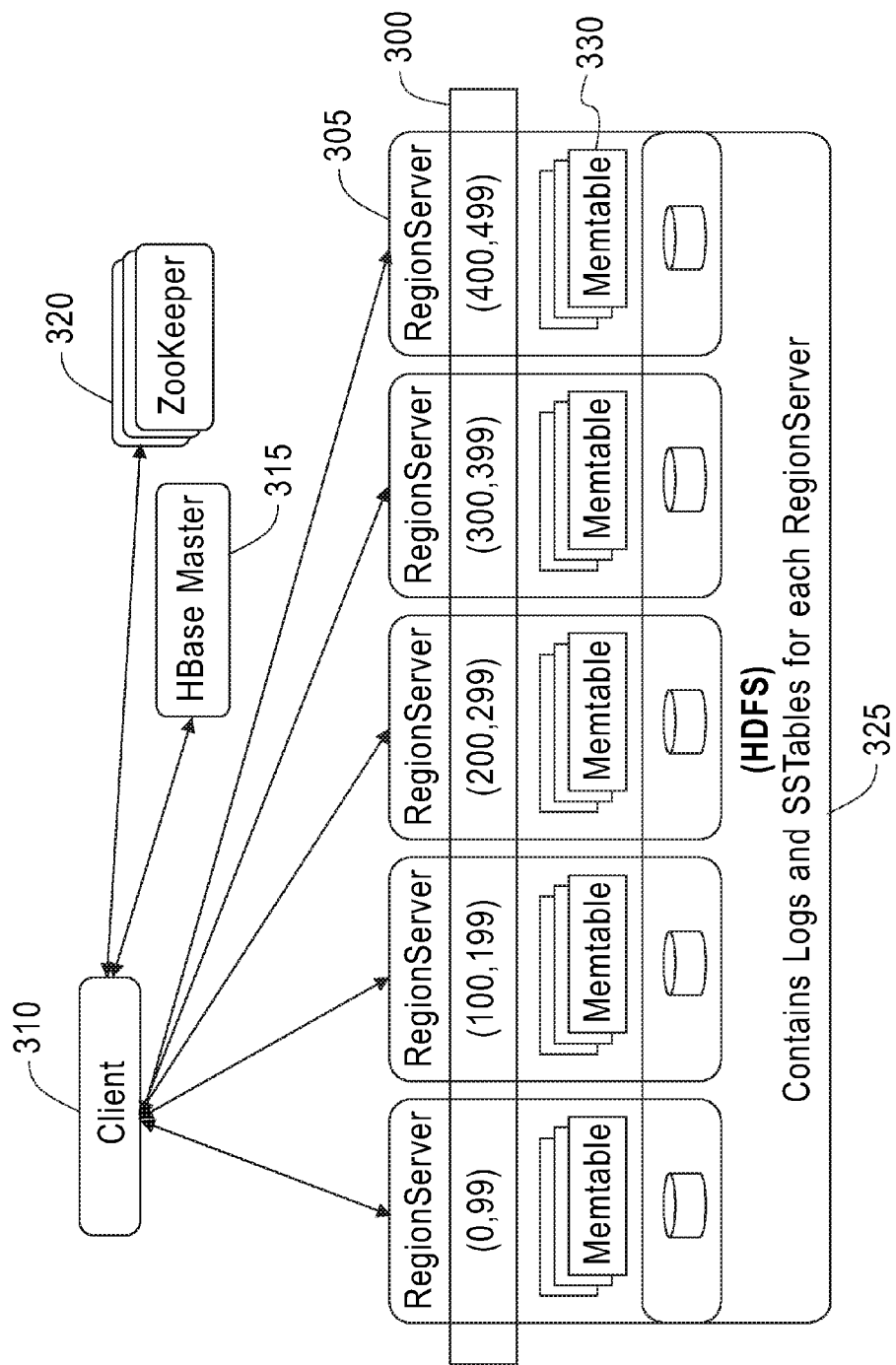
FIG. 3 illustrates HBase architecture.

As shown in FIG. 3, in each HBase table, a key space is partitioned 300 into Regions and each region is assigned to a RegionServer 305, e.g., a server device which has its own DBMS (Database Management System) and manages data in the HBtable of its corresponding partitioned key space. A RegionServer 305 is responsible for serving "puts" functions and "gets" functions for keys that fall in a corresponding Region. A RegionServer may serve more than one Region. A client node 310 may store, e.g., in a cache memory device (not shown), a copy of a key-space partition map and can route a request for a given key to an appropriate RegionServer.

When a put (i.e., data insertion) request arrives at a region server, the Region Server 305 first assigns a timestamp to the put request, and then writes this timestamp to a Write-Ahead-Log (WAL) (not shown). This timestamp is local to a RegionServer and is a monotonically non decreasing 64-bit integer. A WAL is a file on HDFS, and can guarantee durability, i.e., a transaction corresponding to the put request is saved permanently in a backup storage device, for example, HDFS (Hadoop Distributed File System). HDFS refers to a data storage system that stores huge data (e.g., 40 petabytes) and provides the data at high bandwidth (1 gigabyte/sec, etc.) to applications. Once the request has been logged to the WAL, the RegionServer applies an update to the MemStore ("Memtable" 330 shown in FIG. 3 and also "mem-store" 210 shown in FIG. 2). Periodically, contents of the Memtable are sorted, and written to an on-disk LSM component called HTable (not shown). HTables are also written to HDFS and are therefore replicated and guaranteed to be durable. ZooKeeper 320 manages the cluster of RegionServers.

In a data store, availability (availability of data) and consistency (consistency of data) cannot be achieved at the same time, if partition tolerance (i.e., a tolerance to network partition) is desired. Partition tolerance refers to that a system continuously functions though the system is partitioned across a plurality of computing nodes. A system which is tolerant to network partition sacrifices either availability or consistency. Latency of a new index entry insertion depends on how consistent an index to needs to be, e.g., "sync-full," or "asyn-simple" Inconsistency of an index can be tolerable for a certain workload, e.g., data traffic to and from a website or URL (Uniform Resource Locator) yelp.com. A "read" operation of a data entry is more expensive than a "write" operation of a data entry in LSM data store because a multiple versions of a data entry may need to be found upon receiving a data read request of that data entry. An LSM data store does not currently distinguish an insertion of a data entry and an update of a data entry. A client node is not aware that there may exist multiple versions of a data entry until the client node receives a response to read a data entry from a data table.

An index can be considered as a replication of data it indexes. An index update is not always desirable in an Internet-scale, write-intensive workload because of the following reasons:

1. All-or-nothing semantics restrict an availability of a system. In a lot of cases even when an index cannot be synchronized timely, users still want a corresponding data entry to be written to a data table.

2. A protocol, e.g., a known two-phase commit and Paxos (i.e., a set of protocols), can provide a transaction guarantee to index updates; however in a distributed environment this is expensive and results in delays.

3. A lot of workloads have a feature of "write intensive, and read from time to time", for which there is no need to update index immediately upon an update of a corresponding data entry. Also, sometimes it is acceptable that the index as a replication does not react to an update of a corresponding data.

This disclosure describes a novel approach to adding a secondary global index on a scale-out data store based on Log Structured Merge (LSM) Trees. This disclosure proposes multiple different index update schemes: "sync-full," "sync-insert," "async-simple" and "async-session." These schemes are described in detail below herewith. These schemes offer different trade-offs between performance (e.g., a processing time to process a write or read request of a data entry, etc.) and data consistency (e.g., data consistency between a data table and a corresponding index table whose indices point to data entries recorded in the data table), by partially relaxing data consistency and data isolation while retaining atomicity and durability of individual operations.

In one embodiment, the following index update schemes are implemented:

(1) "sync-full": implementing functions that fully synchronize data consistency between a data table and a corresponding index table in the way that an index entry in an index table is immediately updated upon a new data entry to a corresponding data table;

(2) "sync-insert": implementing functions to prevent an old (i.e., stale) index entry in an index table from being deleted upon an insertion of a corresponding new data entry into a corresponding data table (that old index entry in an index table is deleted upon receiving a query directed to the old index entry)

(3) "async-simple": implementing functions that asynchronies an update to an index entry in an index table with an insertion of a corresponding new data entry to a data table 4) "async-session": during a session, i.e., interactive information exchange including one or more messages in each direction, functions are implemented to maintain the data consistency between a data table and a corresponding index table in the way that an index entry is kept updated in a client session cache upon a new data entry to a corresponding data table.

These different index update schemes provide different data consistency levels as follows:

Causal consistent: once a new data entry is successfully inserted to a data table, both data entry and its associated index entry are persisted in the data store (i.e., the associated index entry is immediately inserted to an index table upon the insertion of the new data entry to the data table). This is the strongest consistency level in these different index update schemes and achieved by the "sync-full scheme" to be described in detail below.

Causal consistent with repairing upon receiving a query (i.e., a read request) directed to a new data entry or its associated index entry: an index is causal consistent when a client issues a read request to both an index table and a data table. This is achieved by the "sync-insert" scheme to be described in detail below.

Eventually consistent: once a new data entry is successfully inserted to a data table, its associated index entry is not updated right away but will eventually be, e.g., by running a background processing for updating the associated index entry. This is the weakest consistency level in these different index update schemes and achieved by the "async-simple" scheme described in detail below.

Session consistent: During a session, the data consistency between a data table and a corresponding index table is maintained with a client session cache. This is achieved by the "async-session" scheme described in detail below.

In a LSM data store, "update," "write," "insert" and "put" are used interchangeably. In a LSM data store, a deletion is achieved by indicating a corresponding data or index entry as invalid, e.g., by using setting an invalid bit. In a LSM data store, data is recorded in a data table in a form of a tuple <k, v, t>, where k represents a key, v represents a new value of the key, and t represents a timestamp which indicates a moment that the new value of the key is added to the data table. t can be omitted when it does not include a particular meaning in the context. In one embodiment, an index table includes only keys.

Figure 4:
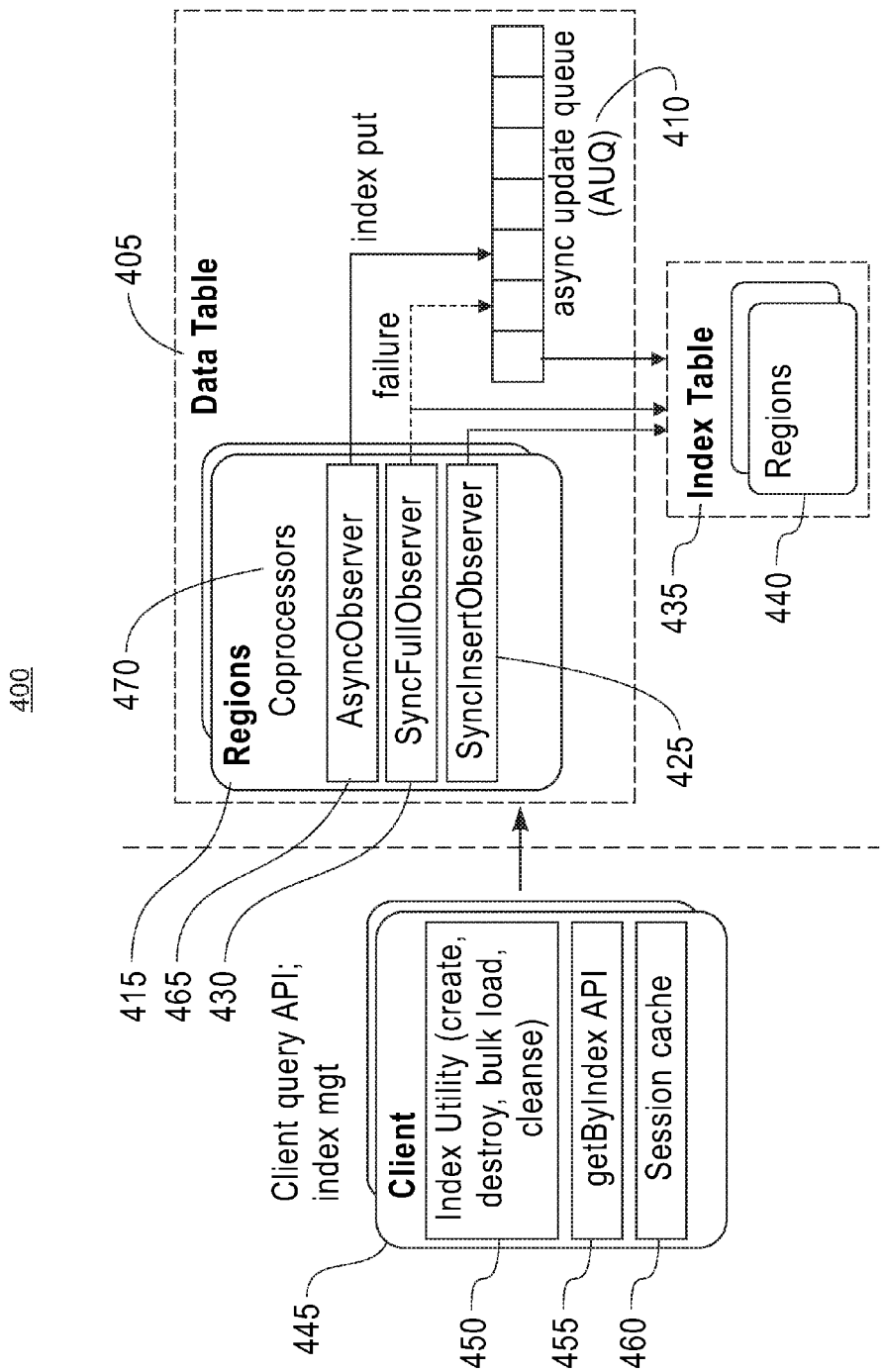
FIG. 4 illustrates a system diagram that implements multiple different index update schemes.
Figure 6:
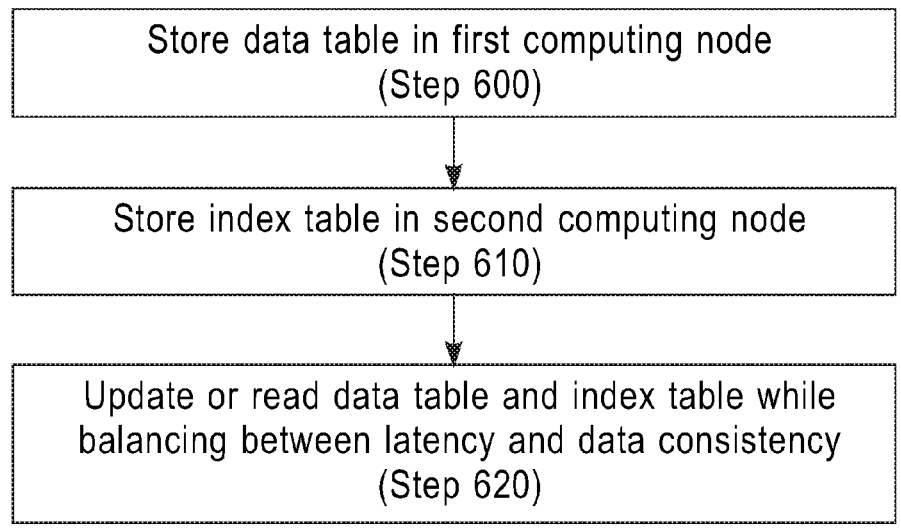
FIG. 6 illustrates a flow chart that describes method steps run by a system shown in FIG. 4.
Figure 12:
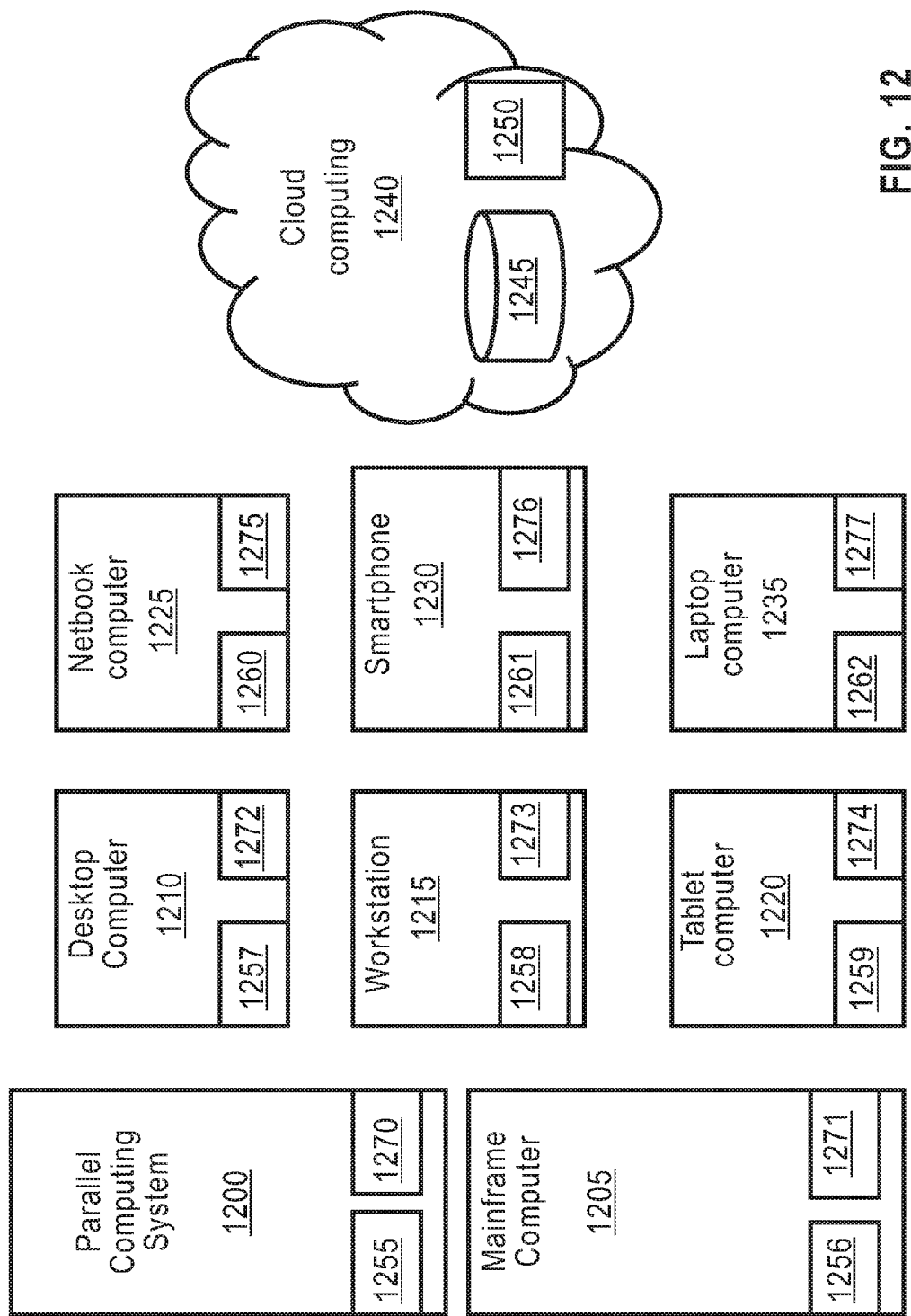
FIG. 12 illustrates exemplary hardware configurations that implement method steps and systems described in this disclosure.

FIG. 4 illustrates a system diagram that implements the different index update schemes. FIG. 6 illustrates a flow chart that describes method steps run by a system 400 shown in FIG. 4. At step 600 in FIG. 6, a system (e.g., the system 400 shown in FIG. 4) stores at least one data table 405 in at least one first computing node 415. At step 610 in FIG. 6, the system stores at least one index table 435 in at least one second computing node 440. Examples of the first computing node 415 and the second computing node 440 are shown in FIG. 12 which is described in detail below. The index table 435 provides keys used for accessing data in said first computing node 415 and other multi-node data stores. At step 620 in FIG. 6, the system performs operations that update or read the data table 405 accessed from the first computing node 415 and that update or read the index table 435 accessed from the second computing node 440. The operations ensures a balance between latency in updating or reading the data table 405 and the index table 435 and that data consistency is maintained between data entries in the data table 405 and data entries pointed by indices in the index table 435.

In one embodiment, the at least one index table includes at least one secondary index, which points to a data entry recorded in the data table. In one embodiment, the operations performed on the data table 405 and the index table 435 are initiated by at least one client node 445. An example of a client node is shown in FIG. 12 described in detail below. A client node 445 can initiate an index utility function call 450 that includes, but is not limited to: creating of an index, destroying of an index, loading of a group of indices to the index table 435, erasing all indices in the index table 435. The client node can further implement an API (Application Programming Interface) 455 to obtain an index from the index table 435, e.g., by using a get( ) function call. The client node 445 can further include a cache memory device 460 that helps to implement "async-session" scheme by enforcing a consistency during a session. The client node 445 can further include another API that enables the client node to send a query to the data table 405 and the index table 435. The client node 445 may also manage the index table 435, e.g., by using the index utility function call 450.

One or more coprocessors 470 provide a means to extend HBase's function without intruding into its core code. Three coprocessors ("AsyncObserver" 465, "SyncFullObserver" 430, and "SyncInsertObserver" 425) are deployed in each index table. They implement functions that listen to and intercept each data entry made to the data table, and act based on the schemes they implement. The SyncFullObserver 430 implements "sync-full" scheme. The SyncInsert Observer 425 implements "sync-insert" scheme. The "AsyncObserver" 465 implements "async-simple" and "async-session." Responsive to an index update scheme being selected, e.g., by a user, a corresponding observer (e.g., "AsyncObserver" 465, etc.) is active.

"Sync-Full" Scheme

Under "sync-full" scheme, the client node 445 sends to a coprocessor (i.e., a processor supplementing a primary processor) called "SyncFullObserver" 430 a request to insert a new data entry. Then, the SyncFullObserver 430 inserts a corresponding new data entry to the data table 405. The SyncFullObserver 430 also synchronously inserts a new index entry into the index table 435 upon inserting the corresponding new data entry to the data table 405. The SyncFullObserver 430 synchronously deletes a corresponding stale index entry in the index table 435 upon the insertion of the corresponding new index entry to the index table 435. Once the synchronous inserting and deleting are successfully performed in the index table 435 and the data table 405, the data consistency is maintained between the index table 435 and the data table 405.

Figure 9:
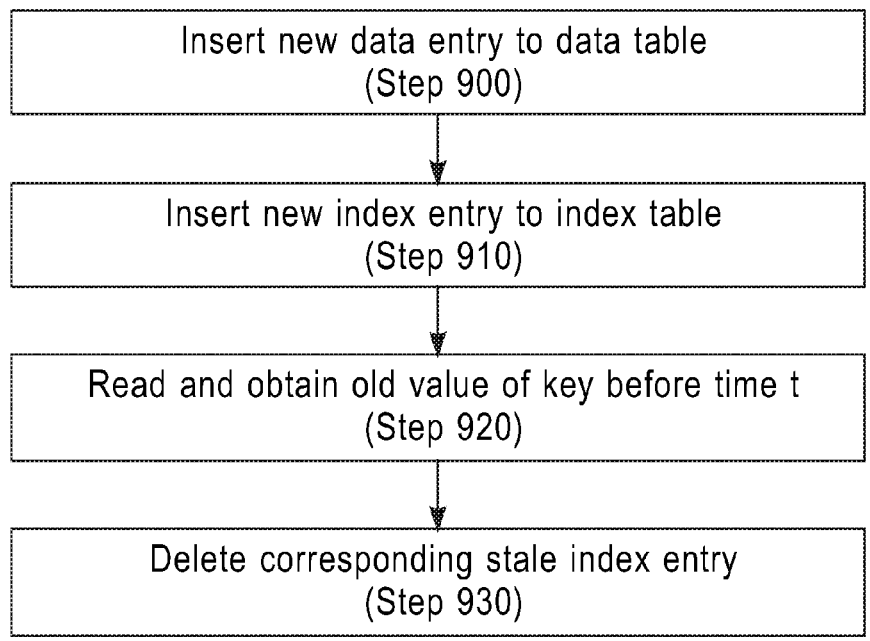
FIG. 9 illustrates a flow chart that describes method steps for updating an index under "sync-full" scheme.

FIG. 9 illustrates a flow chart that describes method steps for updating an index under "sync-full" scheme. At step 900 in FIG. 9, the SyncFullObserver 430 inserts the new data entry, represented by a tuple <k, v, t>, to the data table 405. At step 910 in FIG. 9, the SyncFullObserver 430 inserts the new index entry into the index table 435. In one embodiment, the new index entry is represented by a tuple <v⊕k, null, t>, where ⊕ represents a byte array concatenation operation. At step 920 in FIG. 9, the SyncFullObserver 430 reads and obtains an old value of the key k before the time t. In order to read and obtain the old value of the key k before the time t, the SyncFullObserver 430 accesses the data table 405. The SyncFullObserver 430 reads a value of the key k, which was inserted prior to the timestamp t. The read value represents the old value of the key k. At step 930, the SyncFullObserver 430 deletes the corresponding stale index entry, which is represented by the old value of the key k⊕the key k. In order to delete the stale index entry, the SyncFullObserver 430 marks the stale index entry as invalid, e.g., by setting an invalid bit in the stale index entry.

In one embodiment, a latency of "sync-full" scheme can be calculated according to equation (1) by:

$$L(\text{sync-full}) = L(P_1) + L(R_B) + L(D_1) \quad (1),$$

where L(sync-full) represents the latency of "sync-full" scheme, $L(P_1)$ represents a time that takes to insert the new index entry to the index table 435, $L(R_B)$ represents a time that accesses the data table and reads the old value of the key k, $L(D_1)$ represents a time that takes to mark the stale index entry as invalid. $L(R_B)$ would be much larger than both $L(P_1)$ and $L(D_1)$.

"Sync-Insert" Scheme

In FIG. 9, by running only steps 900-910 and skipping steps 920-930, the major component $L(R_B)$ from the right-hand side of equation 1 is removed. This scheme called "Sync-insert", which runs method steps only 900-910 in FIG. 9, shortens index update latency significantly according to equation (2):

$$L(\text{sync-insert}) = L(P_1) \quad (2),$$

Figure 7:
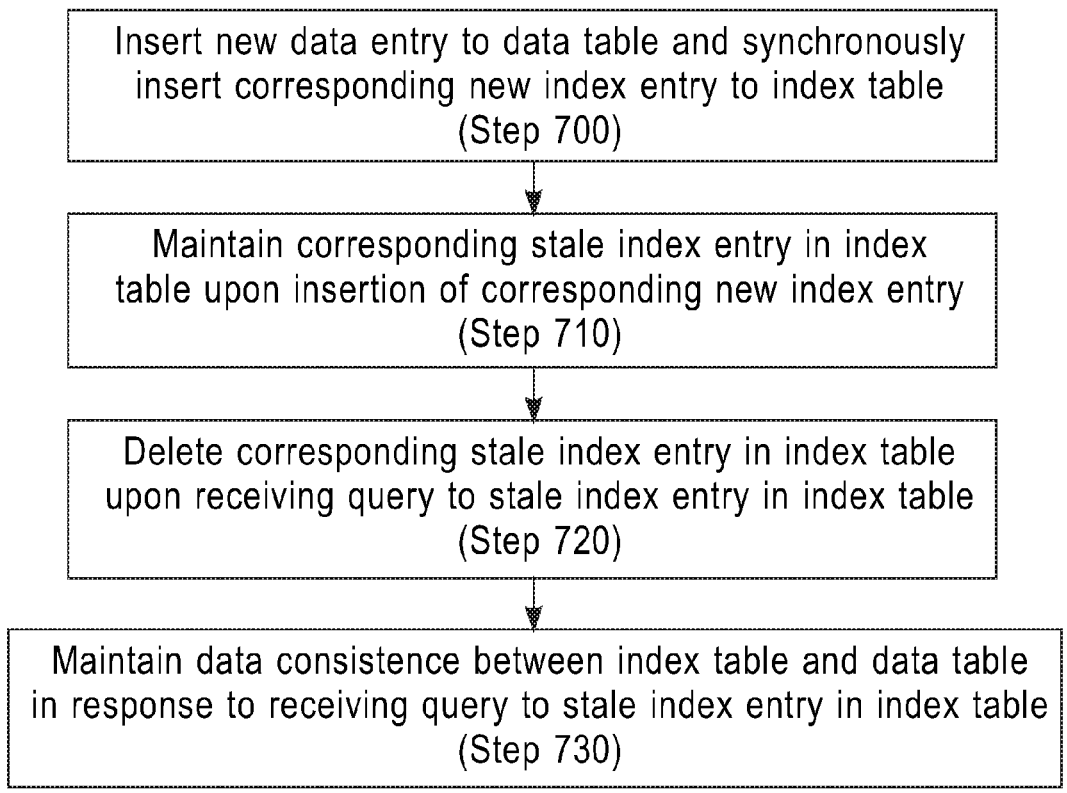
FIG. 7 illustrates a flow chart that describes method steps for "Sync-insert" scheme.

FIG. 7 illustrates a flow chart that describes method steps for "Sync-insert" scheme. At step 700, the client node 445 sends to a coprocessor called the SyncInsertObserver 425 a request to insert a new data entry. Then, the SyncInsertObserver 425 inserts a corresponding new data entry to the data table 405 and synchronously inserts a corresponding new index entry into the index table. At step 710, the SyncInsertObserver 425 maintains a corresponding stale index entry in the index table 435 upon the insertion of the corresponding new index entry to the index table 435. At step 720, the SyncInsertObserver 425 invalidates the corresponding stale index entry in the index table 435, upon receiving a query to the corresponding stale index entry in the index table 435. In order to invalidate the corresponding stale index entry, the SyncInsertObserver 425 uses the method steps 800-855 shown in FIG. 8 and described in detail below. At step 730, the SyncInsertObserver 425 maintains the data consistency between the index table and the at least one data table in response to receiving a query to the corresponding stale index entry in the at least one index table.

Figure 8:
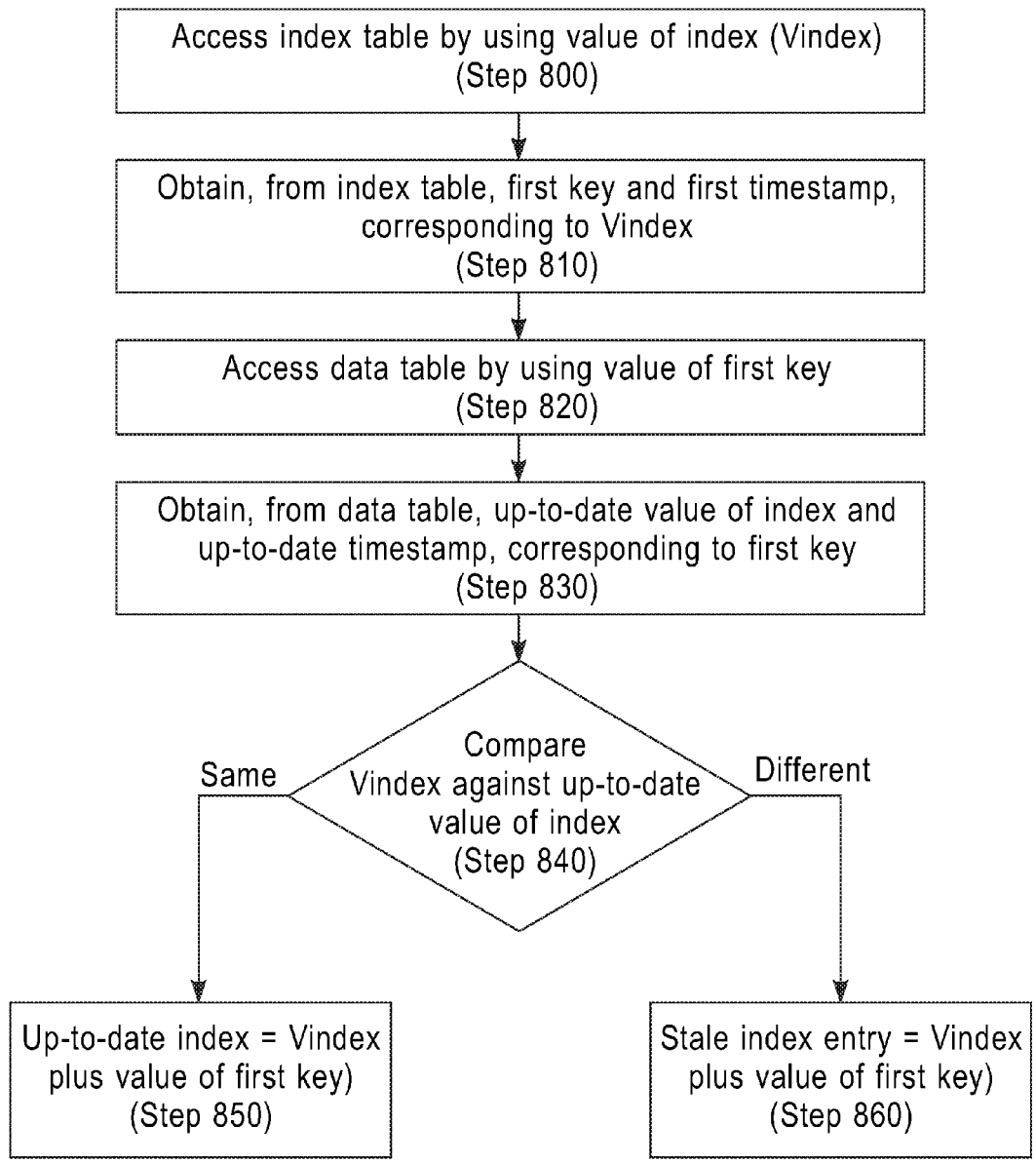
FIG. 8 a flow chart that describes method steps 720-730 in detail.

FIG. 8 illustrates a flow chart that describes method steps 720-730 in detail. The client node 455 sends a read request of an index to the SyncInsertObserver 425. At step 800, the SyncInsertObserver 425 accesses the index table 435 by using a value of an index ($v_{index}$) that corresponds to the index read request. At step 810, the SyncInsertObserver 425 obtains, from the accessed index table 435, a first key and a first timestamp, corresponding to the $V_{index}$. At step 820, the SyncInsertObserver 425 accesses the data table 405 by using a value of the first key. At step 830, the SyncInsertObserver 425 obtains, the accessed data table, an up-to-date value of the index and an up-to-date timestamp, corresponding to the first key.

At step 840, the SyncInsertObserver 425 compares the $v_{index}$ against the up-to-date value of the index. At step 850, the SyncInsertObserver 425 determines that an up-to-date index entry is the $v_{index}$⊕the value of the first key if the $v_{index}$ is equal to the up-to-date value of the index. At step 860, the SyncInsertObserver 425 determines that the corresponding stale index entry is the $v_{index}$⊕the value of the first key if the $v_{index}$ is not equal to the up-to-date value of the index and the first timestamp is made prior to the up-to-date timestamp. The SyncInsertObserver 425 invalidates the determined stale index entry, e.g., by setting an invalid bit of the determined stale index entry.

Under "Sync-insert" scheme, the client node 445 sends to the SyncInsertObserver 425 a request to insert a new data entry. Then, the SyncInsertObserver 425 inserts a corresponding new data entry to the data table 405. The SyncInsertObserver 425 invalidates a corresponding stale data entry in the data table 405 upon the insertion of the new data entry into the data table 405. In order to invalidate one or more stale data entry corresponding to the new data entry, the SyncInsertObserver 425 identifies data entries which share a same key with the new data entry but which have timestamps older than a current timestamp of the new data entry. Then, the SyncInsertObserver 425 sets invalid bit(s) of the identified data entries. Under "Sync-insert" scheme, a new index entry and a corresponding stale index entry co-exist in the index table 435 until a query to the corresponding stale index entry is received at the index table 435.

Compared to "sync-full" scheme, "sync-insert" scheme does not perform steps 920-930 in FIG. 9 during an index update but rather performs the additional steps 830-860 in FIG. 8 during an index read. Under "sync-insert" scheme, the "SyncInsertObserver" 425 runs method steps in FIG. 8 during an index read, i.e., reading an index entry from the index table 435.

"Async-Simple" Scheme

"Async-simple" scheme offers low latency on an index update because an index update is performed by a background processing, e.g., UNIX® or LINUX® background processing. A data entry read latency of "async-simple" scheme is same to a data entry read latency of the "sync-full" scheme.

Under "Async-insert" scheme, the client node 445 sends to a coprocessor called AsyncObserver 465 a request to insert a new data entry. Then, the AsyncObserver 465 inserts a corresponding new data entry to the data table 405. The AsyncObserver 465 asynchronously inserts a corresponding new index entry into the index table 435 upon inserting the new data entry into the data table 405. The AsyncObserver 465 asynchronously deletes a corresponding stale index entry in the index table 434 upon inserting the new data entry into the data table 405. The index table 435 is not updated right away when the new data entry is inserted to the data table 405. The background processing performs the asynchronous insertion of the new index entry to the at least one index table, and performs the asynchronous deletion of the corresponding stale index entry in the at least one index table.

Figure 10:
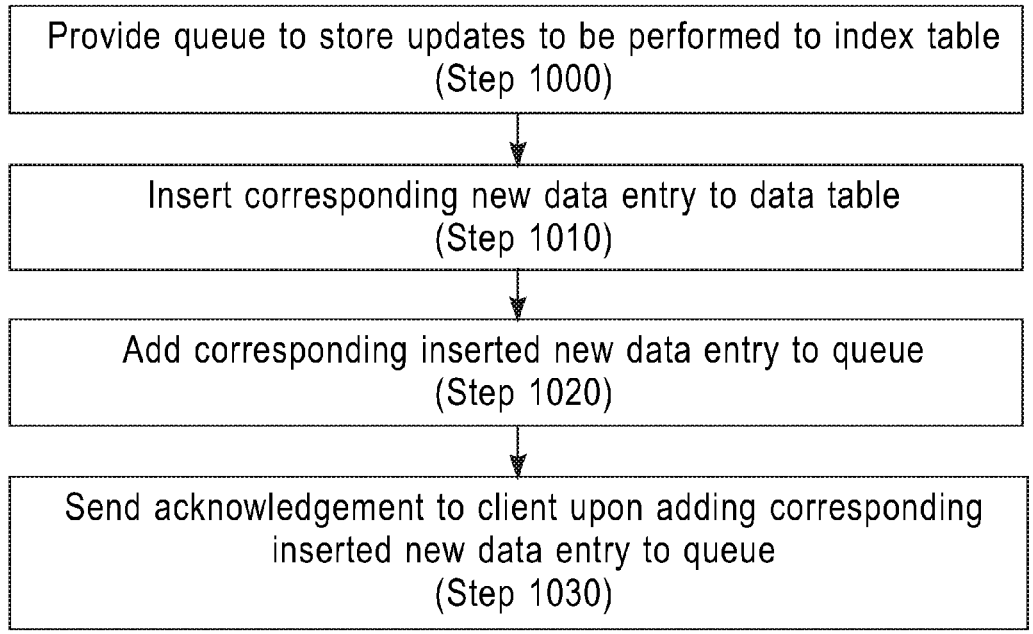
FIG. 10 illustrates a flow chart that describes method steps for preparing an index update under "async-simple" scheme.

FIG. 10 illustrates a flow chart that describes method steps for preparing an index update under "async-simple" scheme.

At step 1000, there is provided a queue (e.g., async update queue (AUQ) 410 shown in FIG. 4), which stores, as entries, updates to be performed to the index table 435. At step 1010, the AsyncObserver 465 inserts the corresponding new data entry, represented by the tuple <k, v, t>, to the data table 405. At step 1020, the AsyncObserver 465 adds the corresponding inserted new data entry into the provided queue (e.g., AUQ 410 in FIG. 4). At step 1030, the AsyncObserver 465 sends an acknowledgement to a client node upon adding the corresponding inserted new data entry into the provided queue.

In one embodiment, in order to update an index table, the background processing dequeues an update, represented by the added new data entry, from the provided queue. The background processing reads and obtains an old value of the key k before the time t, e.g., by using the method step 920 described above. The background processing deletes the corresponding stale index entry, which is represented by the old value of the key k⊕ the key k. The background processing inserts the new index entry into the at least one index table. The new index entry is represented by a tuple <v⊕k, null, t>, where v is the new value of the key k.

"Async-Session" Scheme

"Async-session" scheme can provide a way for application developers to hide a complexity of dealing with eventual consistency between a data entry and a corresponding index entry while still getting most of latency and throughput benefits of asynchronously maintained indexes. Consider two different users posting the following sequence of operations:

| User 1 | User 2 |
| --- | --- |
| 1. View reviews for product A | View reviews for product B |
| 2. Post review for product A | |
| 3. View reviews for Product A | View reviews for Product A |

User 1 views reviews for a product A while User 2 is browsing reviews for a different product B. Next, User 1 posts a review for a product A, and requests to view reviews for product A again in order to possibly to see if his review gets listed correctly. If this request is served by looking up a secondary index on a product column in the "Reviews" table 100 as shown in FIG. 1 and if a corresponding index entry is maintained asynchronously, it is possible that User 1, at time=3 does not see his own review appear when he lists all the reviews for the product A because the index has not yet been updated when User 1's query was run. This is an undesirable effect, and may lead to User 1 assuming that his posting was lost and resubmitting it—only to find his review getting listed twice when he finally queries for it.

By using "async-session" scheme, User 1 would be guaranteed to see his review at time=3 when he lists all reviews for product A after posting his own review. However, User 2 may not be guaranteed to see User 1's third review of product A even though User 2's query arrived at time=3, after the third review of User 1 had been posted.

Under "async-session" scheme, any index lookups are guaranteed to include updates to corresponding data that have been made in a current session. A session refers to interactive information exchange including one or more messages in each direction.

Consider an exemplary session as follows:

```
s = get_session( )
    put (s, table, key, colName, colvalue)
    getFromIndex (s, table, colName, colvalue)
end_session(s)
``` put( ) and getFromIndex( ) behave exactly like their regular counterparts except that they take an extra argument: a session ID that's generated by the get session( ) call. getFromIndex( ) returns a data entry using an input index, e.g., colName (column name in a table). The getFromIndex( ) call guarantees that a user will see any updates made to any index by operations included in a session identified by "s."

In a get_session( ) call, a client library (i.e., an application programming interface used for creating client applications) creates a random session ID, adds an entry in a data structure (e.g., array, etc.) that tracks a corresponding live session, and returns this ID to the application. For all operations during a session, the client library maintains a set of local, private, in-memory tables associated with the session ID and updates them every time a server device returns a success for a request. To service read requests which returns consistent data entries, the client library first runs a regular "read" operation that gets results from an appropriate RegionServer, but before returning to a client node, it merges this "read" operation with contents of the private table in the client library. Under "async-session," results from an index table (which is read by a RegionServer) and session cache are combined during an index read. The intuition behind this approach is to track a local state of each session that might not be synchronously maintained in an index table.

When an index table is updated, the client library submits this request as a regular call, but also requests that the server devices return an old value and a new timestamp assigned to the update. The library uses the old value and the new timestamp to identify corresponding stale index entries in the index table. The server device also generates a new index entry based on a new value of a data entry in the data table and inserts the new index entry into the index table.

On "get( )" requests, results returned by the server device get combined with data in the data structures of the client library. Private data associated with a session is garbage collected when a client issues an end_session( ) call.

In one embodiment, a maximum limit for a session duration is set to 30 minutes. If a session is inactive longer than this limit (e.g., 30 minutes), then data stored in the private table for this session is automatically garbage collected. An application that issues a request under this session ID after 30 minutes gets a session expiration error. An application may choose to deal with this error in one of several ways: it can either show this to the user as a notification with a disclaimer that a new session is starting. Alternatively, the application ignores the expiration error, and re-issue the request either with regular consistency (e.g., by using "sync-full" scheme rather than "async-session") or with a new session.

Figure 5:
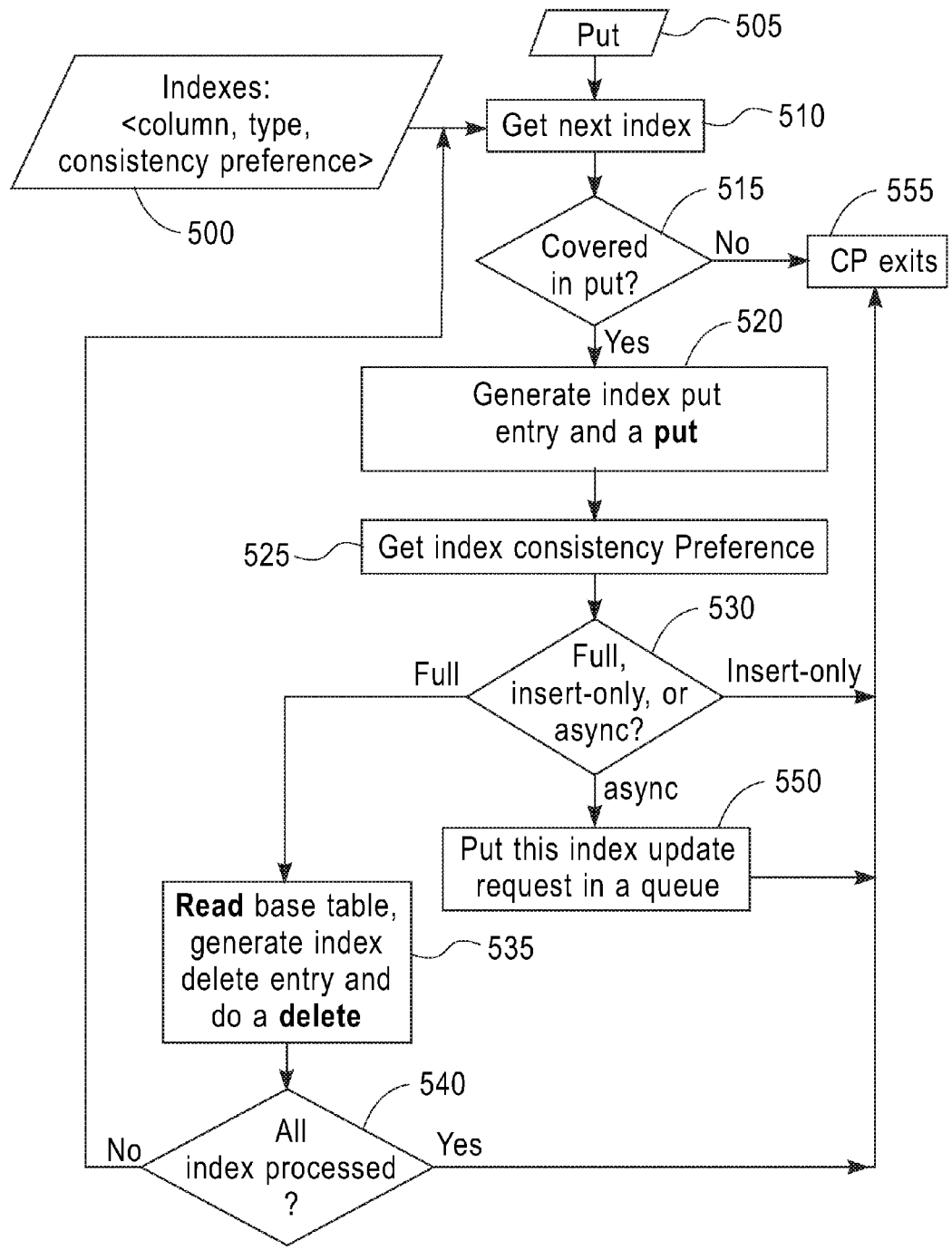
FIG. 5 illustrates a flow chart that describes method steps for implementing multiple different index update schemes.

FIG. 5 illustrates a flow chart that describes method steps run by the system 400 shown in FIG. 4. At step 505, the system receives a data update request, i.e., an put( ) operation, submitted from the client node 445 shown in FIG. 4. The received put( ) operation includes, but is not limited to: a table identification, a key, a column name, a column value. The put( ) operation identifies a data table based on the table identification. The put( ) operation further identifies an entry in the data table based on the key and the column name. The put( ) operation inserts the column value into the identified entry in the data table 405. At step 510, the system retrieves a corresponding index definition 500 from the data table 405 shown in FIG. 4. The retrieved index definition 500 includes, but is not limited to: a column name, a data type, and an index update preference ("sync-full" scheme, "sync-insert" scheme, "async-simple" scheme, or "async-session" scheme). At step 515, the system evaluates whether the received put( ) operation 505 covers an index, e.g., by determining whether the column name in the index definition corresponds to the column name in the put( ) operation 505. If an index is not covered by the put( ) operation, at step 555, no index update is needed and the coprocessor(s) exits the method steps in FIG. 5. If an index is covered by the put( ) operation 505, at step 520, the system generates a corresponding new index entry that corresponds to the received put( ) operation 505, and performs an index entry put operation, e.g., insertion of a new index entry in the index table 435.

At step 525, the system identifies the index update preference from the retrieved index definition 500. At steps 530 and 555, if the index update preference is the "sync-insert" scheme, the system invokes the "SyncInsertObserver" 425 in order to proceed a corresponding index update according to "sync-insert" scheme. If the index update preference is the "async-session" scheme or "async-simple" scheme, at steps 550-555, the system inserts the corresponding index update request into the AUQ 410, and invokes the "AsyncObserver" 465 in order to proceed the index update according to "async-session" scheme or "async-simple" scheme.

At steps 530-535, if the index update preference is the "sync-full" scheme, the system invokes the "SyncFullObserver" 430 in order to proceed the corresponding index update according to "sync-full" scheme. At step 540, the system evaluates whether all the indexes updates are processed. If all the indexes are not processed, the control returns to step 510. Otherwise, the control goes to step 555 in order to exit the method steps shown in FIG. 5.

Failure Recovery

In the event that any of the RegionServers fails, HBase does the following: a master node (e.g., ZooKeeper 320 in FIG. 3) detects the failure through a timeout-based mechanism, e.g., a RegionServer does not send an expected status report within a specified time period. The master node then retrieves the WAL corresponding to the failed RegionServer. WAL is available on HDFS 325 and splits it into separate logs: one for each region. Then, the master node re-assigns all the Regions that were assigned to the failed RegionServer to currently available RegionServers. This re-assignment is typically based on a current workload of the currently available RegionServers, but any re-assignment strategy can be used here. The currently available RegionServers replay the WAL corresponding to the regions they have been assigned, and then regenerates writes that have been lost due to the failure. HTables corresponding to these assigned regions may be on remote RegionServers, and therefore most write operations may involve reading non-local data. This non-local data will eventually move to a local RegionServer after HTables are compacted into a new HTable.

In an event that a HBase Master node 315 fails, a new Master node is elected by Zookeeper 320. In this disclosure, in the event that a RegionServer fails, the same protocol described above can be used. However, if the WAL is checkpointed and rolled forward while there are still un-processed updates in an AUQ (e.g., AUQ 410 shown in FIG. 4), the server might be exposed to a vulnerability. If a RegionServer fails when there is un-processed updates in an AUQ, then data entry insertions to AUQ for which index updates had not yet been processed cannot be reconstructed from entries in the WAL. To guard against this possibility, a modification to checkpoint code is made in order to lock the AUQ and block index updates that may add new entries to the AUQ, while waiting until all un-processed entries in the AUQ drains and then proceed with the checkpoint code to roll the WAL forward. Draining the AUQ can be accomplished without actually modifying any HBase code using a preFlush( ) coprocessor hook, i.e., a function call which is called before memstore is flushed into a storage device.

During replaying the WAL, previous "put" operations (i.e., insertion operation) for which a failed RegionServer had already delivered an index update (using the AUQ 410 shown in FIG. 4) may get re-processed. As a result, some of the index updates may get delivered more than once to an index table. This does not cause any problems since the index updates are idempotent: inserting a column into a row with a same or older timestamp as an existing column has no effect. This is accomplished by ensuring that a timestamp is assigned to a put operation before it is written to the WAL.

FIG. 11 illustrates a table 1100 that summarizes an I/O cost of each different index update scheme, in terms of the read/write operations involved. For each scheme, this table 1100 considers two actions, i.e., index update and index read. For these two actions (read and write operations), "put a new data entry in the data table" (also called "Base Put"), "read a data entry from the data table" (also called "Base Read"), "put a new index entry in the index table" (also called "Index Put") and "read an index entry from the index table" (also called "Index Read") are counted. For example, when no index table is used 1105, an update to a data table involves one "Base Put"; since it is assumed that there is no index under a row 1105, reading of an index is not possible under the row 1105. Under the "sync-full" scheme 1110, an index update involves one "Base Put", one "Base Read", one "Index Put" and (possibly) one "Index Delete" (indicated as "1+1" in the column named Index Put); reading of an index involves one "Index Read." Under the "sync-insert" scheme 1115, reading of an index involves one "Index Read", M "Base Read" (assuming that reading of an index returns M rows of an index table), and (possibly) M Index Delete; an index update involves one "Base Put" and one "Index Put." Under the "async-simple" scheme 1120, "[ ]" indicates asynchronous operations; an index update involves one "Base Put", one asynchronous operation of "Base Read", one asynchronous operation of "Index Put" and (possibly) one asynchronous operation of "Index Delete" (indicated as "1+1" in the column named Index Put); reading of an index involves one "Index Read." Here there is no distinction between a "put" operation and a "delete" operation because their cost is similar in LSM.

ACID Properties of the Different Index Update Schemes

Atomicity:

when a "Base Put" occurs, there are three follow-up operations shown in the right-hand side of the equation 1. Each individual operation, i.e., $P_1$ (an insertion of a new index entry to the index table), $R_B$ (reading a value of a key from the data table), and $D_1$ (a deletion of a stale index entry in the index table), is atomic. This atomicity is offered by an atomicity of primitive HBase operations put( ) read( ) and delete( ) respectively. If any of them fails, the system (e.g., the system 400 shown in FIG. 4) does not roll-back the Base Put. Instead, the system inserts the failed task(s) into the AUQ and the failed tasks will be retried by the background processing until eventually succeed. In other words, if the Base Put succeeds, the Index Put is also guaranteed to complete eventually. Under these different index update schemes, there is no global transaction so the three operations are not guaranteed to occur at the same time. This may have implications on consistency and isolation but with an advantage of no global locking and coordination.

Consistency:

"sync-full" scheme and "sync-insert" scheme are causal consistent: once all index update operations complete and a SUCCESS is returned to a client, both a data entry and its associated index entry are maintained consistently in a data store. If any index operation fails, a corresponding Base Put operation is still persisted and the failed operation is added to the AUQ. In this failed operation, casual consistency is no longer guaranteed and AUQ is responsible for an eventual consistency between an index entry and a corresponding data entry, i.e., that index points to that data entry. "Async-simple" scheme and "async-session" schemes provide eventual consistency and session consistency, respectively.

Isolation:

In one embodiment, Read Commit isolation is implemented: allowing a transaction to obtain a lock (a lock for reading of data or a lock for writing of data) on a row of a data table that the transaction is accessing. During this transaction, the row cannot be updated by other transactions until the lock is released. However, during an index update, other concurrent clients may see partial results: a client may see a new data entry but not a corresponding index entry at a time point between a corresponding Base Put operation and $P_1$.

Durability:

Durability is guaranteed by the WAL and the AUQ. In "sync-full" and "sync-insert" schemes, operations $P_1$, $R_B$, and $D_1$ are performed, e.g., by a postPut( ) function call (i.e., a function that is called after inserting of a data entry to a data table) that is triggered after Base Put operation. If any one of the operations fails, the system adds the failed operation in the AUQ and the AUQ is responsible for the eventual processing of the failed task. If a RegionServer fails, a recovery mechanism described above guarantees durability.

FIG. 12 illustrates exemplary computing nodes and/or client nodes: a parallel computing system 1200 including at least one processor 1255 and at least one memory device 1270, a mainframe computer 1205 including at least one processor 1256 and at least one memory device 1271, a desktop computer 1210 including at least one processor 1257 and at least one memory device 1272, a workstation 1215 including at least one processor 1258 and at least one memory device 1273, a tablet computer 1220 including at least one processor 1256 and at least one memory device 1274, a netbook computer 1225 including at least one processor 1260 and at least one memory device 1275, a smartphone 1230 including at least one processor 1261 and at least one memory device 1276, a laptop computer 835 including at least one processor 1262 and at least one memory device 1277, or a cloud computing system 1240 including at least one storage device 1245 and at least one server device 1250.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for operating multi-node data stores, the method comprising:
storing at least one data table in at least one first computing node;
storing at least one index table in at least one second computing node, the index table providing keys used for accessing data in said first computing node and other multi-node data stores; and
performing operations that update or read the at least one data table accessed from the at least one first computing node and the at least one index table accessed from the at least one second computing node, the operations optimizing between latency in updating or reading the at least one data table and the at least one index table and data consistency maintained between data entries in the at least one data table and data entries pointed by indices in the at least one index table, said operations comprising:
inserting a new data entry to the at least one data table and synchronously inserting a corresponding new index entry into the at least one index table;
maintaining a corresponding stale index entry in the at least one index table upon the insertion of the corresponding new index entry to the at least one index table;
deleting the corresponding stale index entry in the at least one index table upon receiving a query to the corresponding stale index entry in the at least one index table; and
maintaining the data consistency between the least one index table and the at least one data table in response to receiving the query to the corresponding stale index entry in the at least one index table, the step of deleting the corresponding stale index entry comprising:
accessing the at least one index table by using a value of an index ($v_{index}$);
obtaining, from the accessed at least one index table, a first key and a first timestamp, corresponding to the $v_{index}$;
accessing the at least one data table by using a value of the first key;
obtaining, the accessed at least one data table, an up-to-date value of the index and an up-to-date timestamp, corresponding to the first key;
comparing the $v_{index}$ against the up-to-date value of the index; and
determining that an up-to-date index entry is (the $v_{index} \oplus$ the value of the first key) if the $v_{index}$ is equal to the up-to-date value of the index, where $\oplus$ represents a byte array concatenation operation;
determining that the corresponding stale index entry is (the $v_{index} \oplus$ the value of the first key) if the $v_{index}$ is not equal to the up-to-date value of the index and the first timestamp is made prior to the up-to-date timestamp.

2. The method according to claim 1, wherein the at least one index table includes at least one secondary index, which points to a data entry recorded in the at least one data table.

3. The method according to claim 1, wherein the data recorded in the at least one data table includes at least one tuple <k, v, t>, where k represents a key, v represents a new value of the key, and t represents a timestamp which indicates that the new value of the key is added to the at least one data table.

4. The method according to claim 1, further comprising:
invalidating a corresponding stale data entry in the at least one data table upon the insertion of the new data entry into the at least one data table; and
co-existing the corresponding stale index entry and the new index entry in the at least one index table until the query to a query to the corresponding stale index entry is received.

5. The method according to claim 3, wherein the performed operations include:
synchronously inserting a new index entry into the at least one index table upon inserting a corresponding new data entry to the at least one data table, and
synchronously deleting a corresponding stale index entry in the at least one index table upon the insertion of the corresponding new index entry to the at least one index table.

6. The method according to claim 5, further comprising:
inserting the new data entry, represented by the tuple <k, v, t>, to the at least one data table;
inserting the new index entry into the at least one index table, the new index entry represented by a tuple <v$\oplus$k, null, t>, where $\oplus$ represents a byte array concatenation operation;
reading and obtaining an old value of the key k before the time t; and
deleting the corresponding stale index entry, which is represented by the old value of the key k$\oplus$the key k.

7. The method according to claim 6, wherein the step of deleting includes:
marking the corresponding stale index entry as invalid.

8. The method according to claim 6, wherein the step of reading and obtaining includes:
accessing the at least one data table; and
reading a value of the key k, which was inserted prior to the timestamp t, the read value representing the old value of the key k.

9. The method according to claim 5, wherein once the synchronous inserting is successfully performed in the at least one index table and the at least one data table, the data consistency is maintained between the least one index table and the at least one data table.

10. The method according to claim 3, wherein the performed operations include:
asynchronously inserting a new index entry into the at least one index table upon inserting a corresponding new data entry into the at least one data table, and
asynchronously deleting a corresponding stale index entry in the at least one index table.

11. The method according to claim 10, further comprising:
providing a queue which stores, as entries, updates to be performed to the at least one index table;
inserting the corresponding new data entry, represented by the tuple <k, v, t>, to the at least one data table;
adding the corresponding inserted new data entry into the provided queue;
sending an acknowledgement to a client node upon adding the corresponding inserted new data entry into the provided queue.

12. The method according to claim 11, wherein a background processing performs the asynchronous insertion of the new index entry to the at least one index table, and performs the asynchronous deletion of the corresponding stale index entry in the at least one index table.

13. The method according to claim 12, wherein the background processing performs steps of:
dequeuing an update, represented by the added new data entry, from the provided queue;
reading and obtaining an old value of the key k before the time t;
deleting the corresponding stale index entry, which is represented by the old value of the key k$\oplus$the key k;
inserting the new index entry into the at least one index table, the new index entry represented by a tuple <v$\oplus$k, null, t>.

14. The method according to claim 10, wherein the at least one index table is not updated right away when the new data entry is inserted to the at least one data table.

* * * * *